(12) United States Patent
Kitaura

(10) Patent No.: US 6,663,089 B2
(45) Date of Patent: Dec. 16, 2003

(54) HYDRAULIC CYLINDER WITH BOOSTING FUNCTION

(75) Inventor: Ichiro Kitaura, Itami (JP)

(73) Assignee: Pascal Engineering Corporation, Kawanishi (JP)

( * ) Notice: Subject to any disclaimer, the term of this patent is extended or adjusted under 35 U.S.C. 154(b) by 4 days.

(21) Appl. No.: 10/009,129

(22) PCT Filed: Mar. 2, 2001

(86) PCT No.: PCT/JP01/01658

§ 371 (c)(1),
(2), (4) Date: Apr. 11, 2002

(87) PCT Pub. No.: WO01/65137

PCT Pub. Date: Sep. 7, 2001

(65) Prior Publication Data

US 2002/0149140 A1 Oct. 17, 2002

(30) Foreign Application Priority Data

Mar. 3, 2000 (JP) ............................................ 2000-59266

(51) Int. Cl.⁷ .................................................. F16F 7/00
(52) U.S. Cl. ..................... 267/130; 267/119; 267/64.28
(58) Field of Search ................................ 267/130, 119, 267/64.25, 64.13, 64.28, 113, 224, 75, 116; 188/269, 297; 72/453.13

(56) References Cited

U.S. PATENT DOCUMENTS

| 3,752,461 A | * | 8/1973 | Gratzmuller | ................. 267/113 |
| 5,027,637 A | * | 7/1991 | Umetsu | ................. 267/119 |
| 5,098,071 A | * | 3/1992 | Umetsu | ................. 267/119 |
| 5,314,172 A | * | 5/1994 | Wallis | ................. 267/119 |
| 5,465,811 A | * | 11/1995 | Katz | ................. 267/130 |
| 5,823,513 A | * | 10/1998 | Stenquist | ................. 267/64.26 |

FOREIGN PATENT DOCUMENTS

| JP | 4-253525 A | * | 9/1992 |
| JP | 2000-141093 A | * | 5/2000 |

* cited by examiner

*Primary Examiner*—Jack Lavinder
*Assistant Examiner*—Mariano Sy
(74) *Attorney, Agent, or Firm*—Darby & Darby

(57) ABSTRACT

A fluid pressure cylinder with pressure intensifying function, has an oil-filled hydraulic pressure cylinder which is filled with oil and tightly sealed. A gas-filled gas spring is charged with gas and tightly sealed. By means of gas spring, oil in oil chamber of hydraulic pressure cylinder is pressurized to a pressure level higher than the gas pressure in gas actuating chamber of gas spring. This results in a strong pushing force being generated via output piston of hydraulic pressure cylinder.

9 Claims, 11 Drawing Sheets

HYDRAULIC CYLINDER WITH BOOSTING FUNCTION

TECHNICAL FIELD OF THE INVENTION

The present invention relates to a fluid pressure cylinder with a pressure-intensifying function. more particularly, the present invention relates to a fluid pressure cylinder wherein the fluid pressure inside the fluid pressure cylinder is pressurized to high pressure by means of a gas spring.

BACKGROUND OF THE INVENTION

Conventionally, gas springs are used in a variety of mechanisms, such as shock-absorbing/damping mechanisms for press machines, mechanisms for elastic die supports used in multi-stage drawing fabrications, and the like. Gas springs, in general, have a cylinder, a gas actuating chamber within this cylinder filled with compressed nitrogen gas, and a pressure-receiving part which receives the gas pressure of this gas actuating chamber. An output rod, integral with the pressure-receiving part, extends to the exterior of the cylinder and is pushed to the protruding side by the gas pressure of above-indicated compressed nitrogen gas.

For example, where a gas spring is applied as a damping mechanism in a press machine, a damping action is obtained by having the moving parts, such as the press slides, pull out/push in the output rod in opposition to the pushing of the gas pressure of the gas spring. Filling the gas actuating chamber of the gas spring with compressed nitrogen gas is usually done using an existing gas tank. The gas pressure inside a gas tank is 10 MPa~15 MPa, and, due to the relationship that as gas is consumed the gas pressure drops, the gas pressure of the compressed gas which fills the gas actuating chamber is set at a gas pressure (for example, 7 Mpa) lower than the gas pressure within the gas tank.

With a conventional gas spring, it is difficult to fill the gas actuating chamber with high-pressure compressed nitrogen gas. As a result, to be able to generate a strong pushing force and support a large load, it is necessary to have a large gas spring. Such springs will not fit in small spaces and their production costs are high. On the other hand, if the gas pressure of the compressed nitrogen gas which fills the gas actuating chamber is made excessively high, problems occur, such as leakage of the compressed nitrogen gas to leak to the outside.

OBJECTS AND SUMMARY OF THE INVENTION

It is an object of the present invention to provide a pressure-intensifying fluid pressure cylinder which overcomes the foregoing problems.

It is another object of the present invention to pressurize, by means of a gas spring, the liquid in a liquid pressure cylinder to a pressure higher than the gas pressure in the gas actuating chamber. This enables generation of a strong pushing force, thus enabling the support of large loads.

It is a further object of the present invention to provide a fluid pressure cylinder having reduced size, reduced production cost.

It is yet another object of the present invention to provide a fluid pressure cylinder to enable a reset action by means of liquid pressure.

The fluid pressure cylinder with a pressure-intensifying function of the present invention comprises a cylinder body; a liquid chamber formed within the cylinder body, filled with liquid; an output piston which receives the liquid pressure of this liquid chamber; a gas spring having a gas actuating chamber filled with compressed gas and a pressure-receiving means which receives the gas pressure of the gas actuating chamber; wherein the gas spring can pressurize the liquid in said liquid chamber to a pressure higher than said gas pressure.

It is desirable to use oil as the above-mentioned liquid and compressed nitrogen gas as the above-mentioned compressed gas. The gas actuating chamber of the gas spring is filled with compressed gas and the pressure-receiving device receives this gas pressure. The liquid chamber is formed within the cylinder body of the liquid pressure cylinder. By means of the gas spring, the liquid contained in the liquid chamber, is pressurized, via a pressure-receiving device, to a pressure higher than the gas pressure of the gas actuating chamber. The pressurized liquid pressure is received by an output piston.

As the gas spring pressurizes the liquid in the liquid pressure cylinder to a pressure higher than the gas pressure in the gas actuating chamber, it becomes possible to generate a strong pushing force and support heavy loads. By charging the gas actuating chamber with compressed gas from an existing compressed gas supply source, such as a gas tank, the liquid pressure of the liquid chamber can be intensified by several times by means of the pushing force of the gas spring, making it possible to generate the above-mentioned strong pushing force. As a result, the structure of a fluid pressure cylinder with a spring function can be made smaller, resulting in advantages in preventing leaks of the compressed gas and lower production costs.

According to a feature of the present invention, it is desirable that the above-mentioned gas spring cylinder part be formed integrally with the above-mentioned cylinder body and the gas spring and liquid pressure cylinder be position in a straight line pattern. In this case, the fluid pressure cylinder with pressure-intensifying function can be made as a simple structure enabling a reduced production cost.

According to a feature of the present invention, inside the above-mentioned cylinder body, a partitioning means may be provided which separates the liquid chamber and gas actuating chamber. This partitioning means may be secured to the cylinder body by a threaded fit. In this case, in a cylinder body formed integrally with the cylinder part, it is easy to form a liquid chamber and a gas actuating chamber.

In addition, a passage hole maybe formed in above-mentioned partitioning means into which the output rod of the pressure-receiving means is slidably inserted. In this case, the end of the output rod can be made to contact the liquid in the liquid chamber and surely pressurize that liquid.

In addition, to retract the pressure-receiving means, a "liquid chamber for retraction" may be provided in above-mentioned gas spring, configured such that by supplying liquid pressure to the liquid chamber for retraction, the pressure-receiving means is made to retract. In this case, even without applying a strong external force to the output piston in opposition to above-mentioned strong urging force, by supplying liquid pressure of a comparatively low pressure to the liquid chamber for retraction, the pressure-receiving means can be easily retracted.

In addition, in the above-mentioned liquid pressure cylinder, a spring device may be provided to put force on the output piston in the retracting direction. In this case, by making the pressure-receiving means retract, the output piston can surely be made to retract due to the force of the spring device.

In addition, it is desirable that above-mentioned liquid chamber for retraction be formed between above-mentioned partitioning means and the pressure-receiving part of the pressure-receiving means. In this case, because the pressure-receiving part of the pressure-receiving means can be made to receive the liquid pressure of the liquid chamber for retraction, the pressure-receiving means can be retracted by supplying hydraulic pressure at a comparatively low pressure to the liquid chamber for retraction.

The above, and other objects, features and advantages of the present invention will become apparent from the following description read in conjunction with the accompanying drawings, in which like reference numerals designate the same elements.

DETAILED DESCRIPTION OF THE INVENTION

Below, an embodiment of the present invention will be described, referring to the figures. This embodiment is one example of the case of applying the invention to a fluid pressure spring made as a shock-absorbing (damping) mechanism for press machines and the like.

Figure 1:
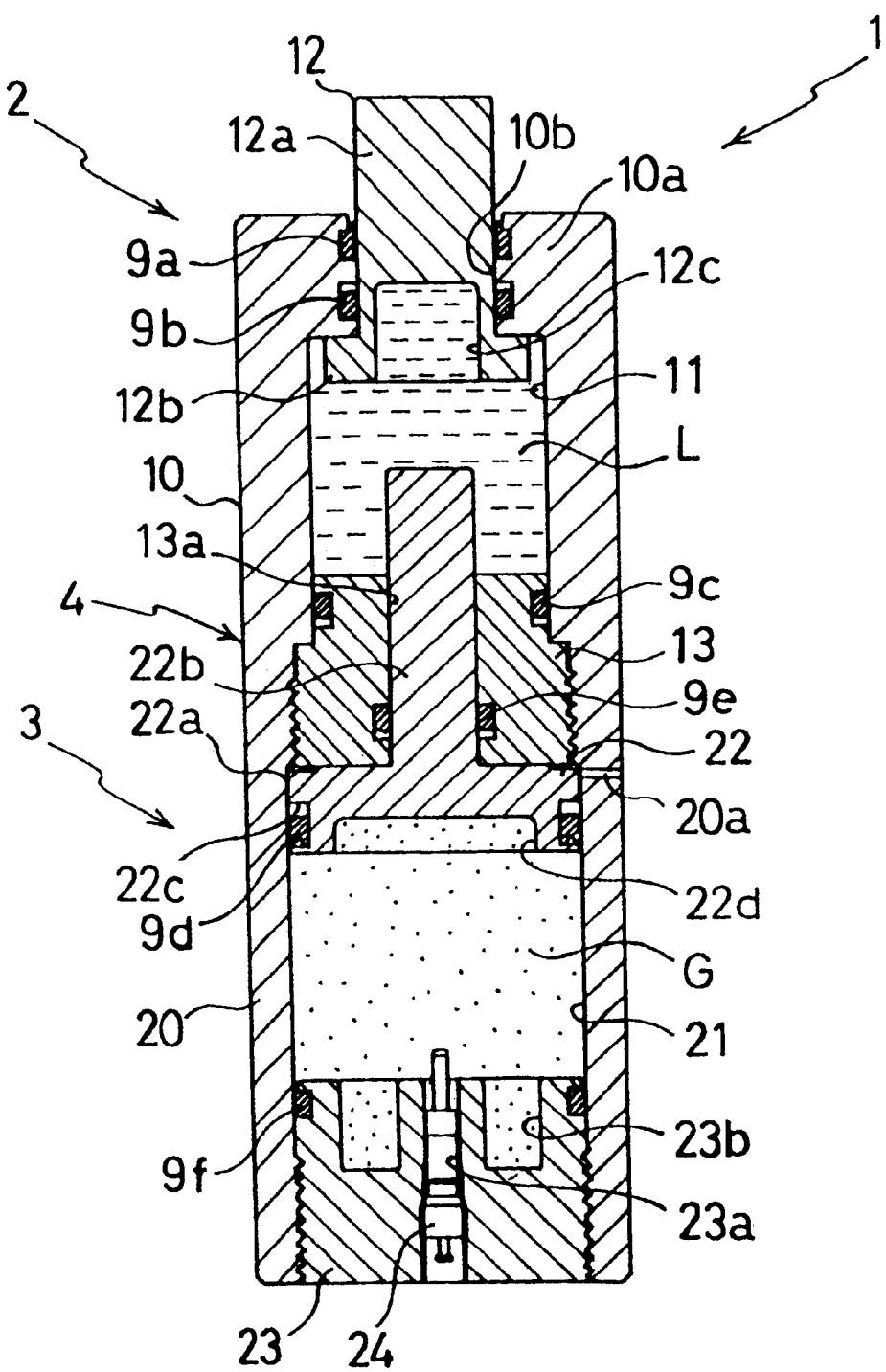
FIG. 1 is a vertical cross-section diagram of the fluid pressure cylinder with pressure-intensifying function (in its extended state) relating to an embodiment of the present invention.
Figure 2:
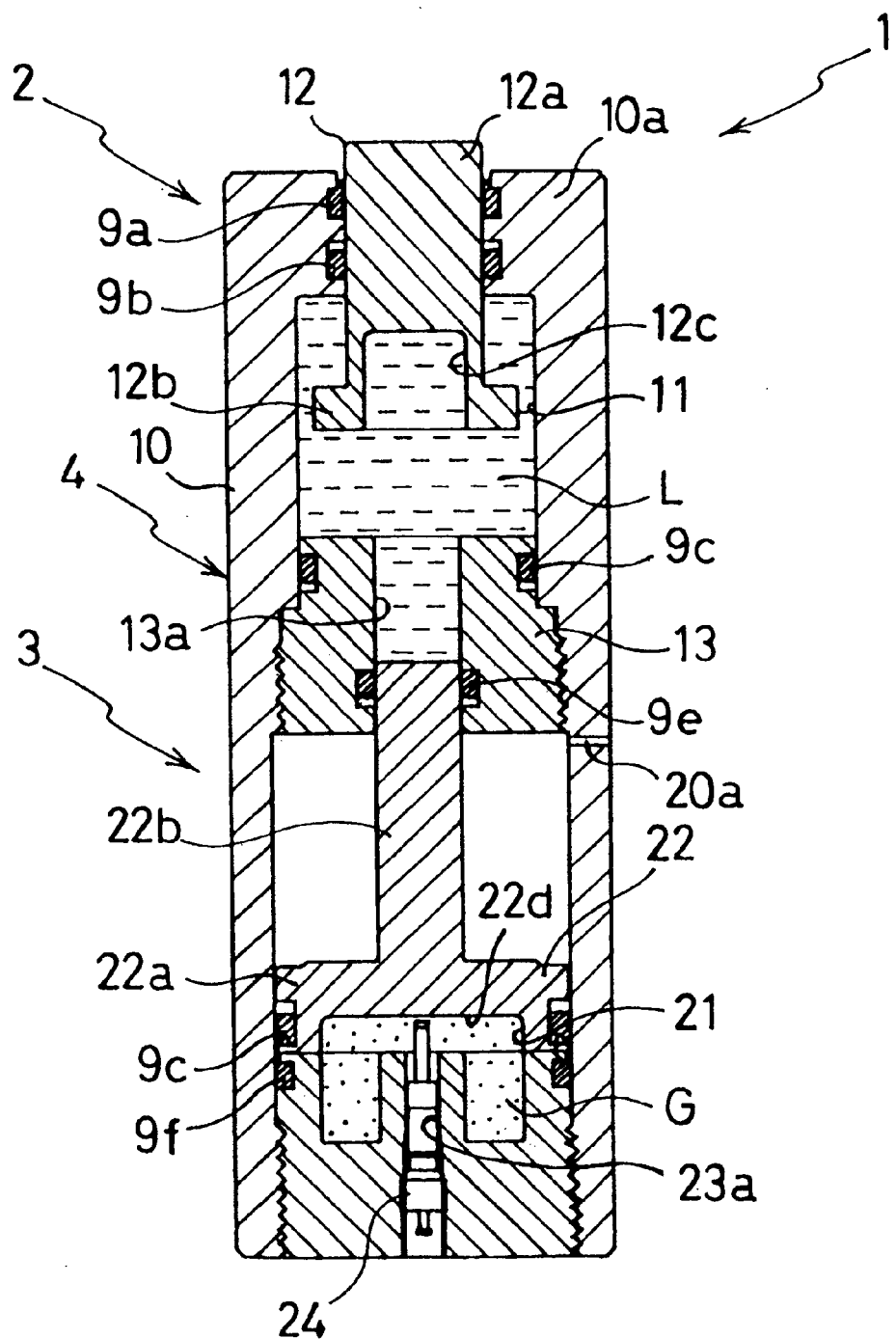
FIG. 2 is a vertical cross-section diagram of the fluid pressure cylinder of FIG. 1 (in its retracted state).

Referring to FIGS. 1 and 2, fluid pressure cylinder with pressure-intensifying function 1 (referred to below as fluid pressure cylinder 1), as a fluid pressure spring, includes an oil containing-type hydraulic pressure cylinder 2, charged with oil L in a tightly sealed state, and a gas containing-type gas spring 3, charged with compressed gas G in a tightly sealed state. Hydraulic pressure cylinder 2 and gas spring 3 have a common cylinder main body 4 and are arranged in a straight row pattern, one above the other.

Description of Hydraulic Pressure Cylinder 2

Hydraulic pressure cylinder 2 includes a cylinder body 10, which makes up approximately the upper half of cylinder main body 4; an oil chamber 11 formed inside cylinder body 10, containing oil L; an output piston 12 which receives the hydraulic pressure of oil chamber 11; and a partitioning means 13 which forms the cylinder end wall.

A passage hole 10b is formed in cover wall 10a of cylinder body 10 and rod 12a of output piston 12 is inserted in this passage hole 10b in a freely sliding manner. The space between the surrounding wall which passage hole 10b of cover wall 10a and rod 12a is sealed by a circular seal part 9a and an O-ring 9b.

Piston 12 has rod part 12a and a pressure-receiving part 12b, provided at the bottom end of rod part 12a. In the lower part of piston 12, from its lower side, a hole 12c is formed. The diameter of pressure-receiving part 12b is formed larger than the diameter of rod part 12a and smaller than the diameter of oil chamber 11, and is held within oil chamber 11. In the state when this pressure-receiving part 12b abuts the lower end of cover wall 10a (see FIG. 1), piston 12 is at its protruding position which is the maximum limit of upward protrusion.

Partitioning means 13 is fixed in the lower end portion of cylinder body 10 by threaded fitting. Specifically, roughly the lower half of partitioning means 13 is thread-fitted to the inside wall of cylinder body 10 and, upward from the threaded fitting portion of partitioning means 13 and of the inside wall of cylinder body 10, partitioning means 13 is formed with a slightly smaller diameter than these threaded parts. By causing the shoulders where partitioning means 13 changes diameter and inside wall of cylinder body 10 changes diameter to engage with each other at this border, partitioning means 13, which is thread-fitted into cylinder body 10, is secured in position. The space between the outer periphery of the upper edge of partitioning means 13 and the inner wall of cylinder body 10 is sealed by O-ring 9c.

Description of Gas Spring 3

Gas spring 3 comprises a cylinder part 20, a gas actuating chamber 21 which has a diameter slightly larger than the diameter of above-mentioned oil chamber 11 and is filled with compressed gas G, a pressure-receiving means 22 which receives the gas pressure of gas actuating chamber 21, a partitioning means 13 which is common to hydraulic pressure cylinder 2 and at the same time comprises the head cover for gas actuating chamber 21, and cylinder end wall 23. Gas spring 3 is configured so that it can pressurize the oil L in oil chamber 11 of hydraulic pressure cylinder 2 to a higher pressure than above-mentioned gas pressure.

Cylinder part 20 includes cylinder main body 4, which is formed integrally with cylinder body 10 of hydraulic pressure cylinder 2, and is partitioned into oil chamber 11 and gas actuating chamber 21 by partitioning means 13.

Pressure-receiving means 22 has a pressure-receiving part 22a internally fitted into cylinder part 20 so that it can slide freely, and an output rod 22b, which extends upward from pressure-receiving part 22a. Circular seal part 9d is mounted in circular channel formed on the circumference of pressure accepting part 22a, and by means of seal part 9d, the space between pressure-receiving part 22a and the inner wall of cylinder part 20 is sealed. In the lower part of pressure-receiving part 22a, concave area 22d is formed which is concave relative to the lower side of pressure-receiving part 22a.

Hole output rod part of pressure-receiving means 22a is slidably inserted into passage hole 13a, formed in partitioning means 13. The space between the lower part of the wall surface of partitioning means 13, which forms passage hole 13a, and output rod 22b, is sealed by means of an O-ring 9e. In cylinder part 20, a venting hole 20a is formed communicating to the gap between partitioning means 13 and pressure-receiving part 22a.

Cylinder end wall 23 is thread-fitted into the lower end portion of cylinder part 20, and in its center part, a gas passage hole 23a, connecting gas actuating chamber 21 to the exterior, is formed. Check valve 24 is built into this gas passage hole 23a, fitted internally in a gas-tight manner. It is configured such that, by means of check valve 24, compressed gas in gas actuating chamber 21 is prevented from leaking out and also compressed gas can be supplied to gas actuating chamber 21 from an external gas supply source (not shown in the figures), such as a gas tank.

Circular concave part 23b is formed in the top side of the upper part of cylinder end wall 23.

Here, in oil chamber 11 of hydraulic pressure cylinder 2, oil L fills the portion surrounded by cylinder body 10, output piston 12, partitioning means 13, and output rod 22b of pressure-receiving means 22, which portion is liquid-tight. While in gas actuating chamber 21 of gas spring 3, compressed gas G fills the portion surrounded by cylinder part 20, pressure-receiving part 22a of pressure-receiving means 22, and cylinder end wall 23, which portion is gas-tight.

When output rod of 22b of pressure-receiving means 22 moves in and out, piston 12 moves in and out in a "linked" manner, so that the volume of oil L (oil chamber 11) does not change. Also, in the state (see FIG. 1) where pressure-receiving part 22a of pressure-receiving means 22 abuts the lower edge of partitioning means 13, that is, the protruding position of pressure-receiving means 22 (upper limit position), and upper part of output rod 22b protrudes into oil chamber 11, and piston 12 also reaches above-mentioned protruding position.

On the other hand, in the state where pressure-receiving part 22a of pressure-receiving means 22 abuts the upper edge of cylinder end wall 23 (see FIG. 2), pressure-receiving means 22 is at its retracted position (lower limit position), and the end of output rod 22b goes down into passage hole 13a of partitioning means 13 to a position just above the level of O-ring 9e. At that time, output piston 12 also goes to its retracted position (lower limit position), a state where the end of output piston 12 protrudes slightly to the outside. Furthermore, when pressure-receiving means 22 is positioned in the retracted position, in gas actuating chamber 21, compressed gas G is in a state of being contained only in concave portion 22d of pressure-receiving part 22a and in circular concave portion 23b of cylinder end wall 23 and thus becomes compressed at high pressure.

Normally, pressure-receiving means 22 is forced to the protruding position by the gas pressure in gas actuating chamber 21, and output piston 12 is also in its protruding position. In this state, the specified pressure (for example, 7 Mpa) for the gas pressure in gas actuating chamber 21 is established. To bring the gas pressure of the gas actuating chamber 21 up to the above-mentioned specified pressure, compressed gas G is supplied to gas actuating chamber 21 from above-mentioned compressed gas supply source, via check valve 24.

In pressure-receiving means 22, because the pressure-receiving surface area which receives the pressure of compressed gas G (the cross-sectional area of pressure-receiving part 22a) is larger (for example, approx. 5 times) than the pressurized surface (cross section of rod 22b) pressurized by oil L, oil L in oil chamber 11 is pressured by that factor to a higher pressure (for example, 35 MPa) than above-mentioned gas pressure (for example, 7 MPa).

With this fluid pressure cylinder 1, it is possible, by means of gas spring 3, to pressurize oil L in oil chamber 11 of oil pressure cylinder 2 to a higher pressure than the gas pressure in the gas actuating chamber 21 of gas spring 3, and as a result, to be able to generate a strong pushing force. Compressed gas is filled into gas actuating chamber 21 from existing compressed gas delivery sources, such as gas tanks, and, by means of the pushing force of gas spring 3, the hydraulic pressure of oil chamber 11 will be increased by a multiple of several times and above-mentioned strong pushing force is generated. As a result, the structure of fluid pressure cylinder 1, which has a spring function, can be made smaller and benefits are gained in terms of preventing leakage of compressed gas G and achieving reduced production cost.

Because cylinder part 20 of gas spring 3 is formed integrally with cylinder body 10 of hydraulic pressure cylinder 2 (by making a common cylinder main body 4), and because gas spring 3 and hydraulic cylinder 2 are arranged in a straight row, fluid pressure cylinder 1 can be made in a simple structure. As a result, production costs are reduced.

Inside cylinder body 10, a partitioning means 13 is provided which forms a partition between oil chamber 11 and gas actuating chamber 21. Because this partitioning means 13 is secured by thread fitting it into cylinder body 10, it is simple to form oil chamber 11 and gas actuating chamber 21 inside cylinder body 10 which is integrally formed with cylinder part 20. In partitioning means 13, a passage hole 13a is formed into which output rod part 22b of pressure-receiving means 22 is inserted such that it can slide freely. As a result, the end of output rod 22a contacts oil L in oil chamber 11 and can surely pressurize oil L.

Next will be described various alternative embodiments of the present invention. Note that for items which are basically the same as in above-mentioned embodiment, the same key number are used and descriptions have been omitted.

First Alternate Embodiment

Figure 3:
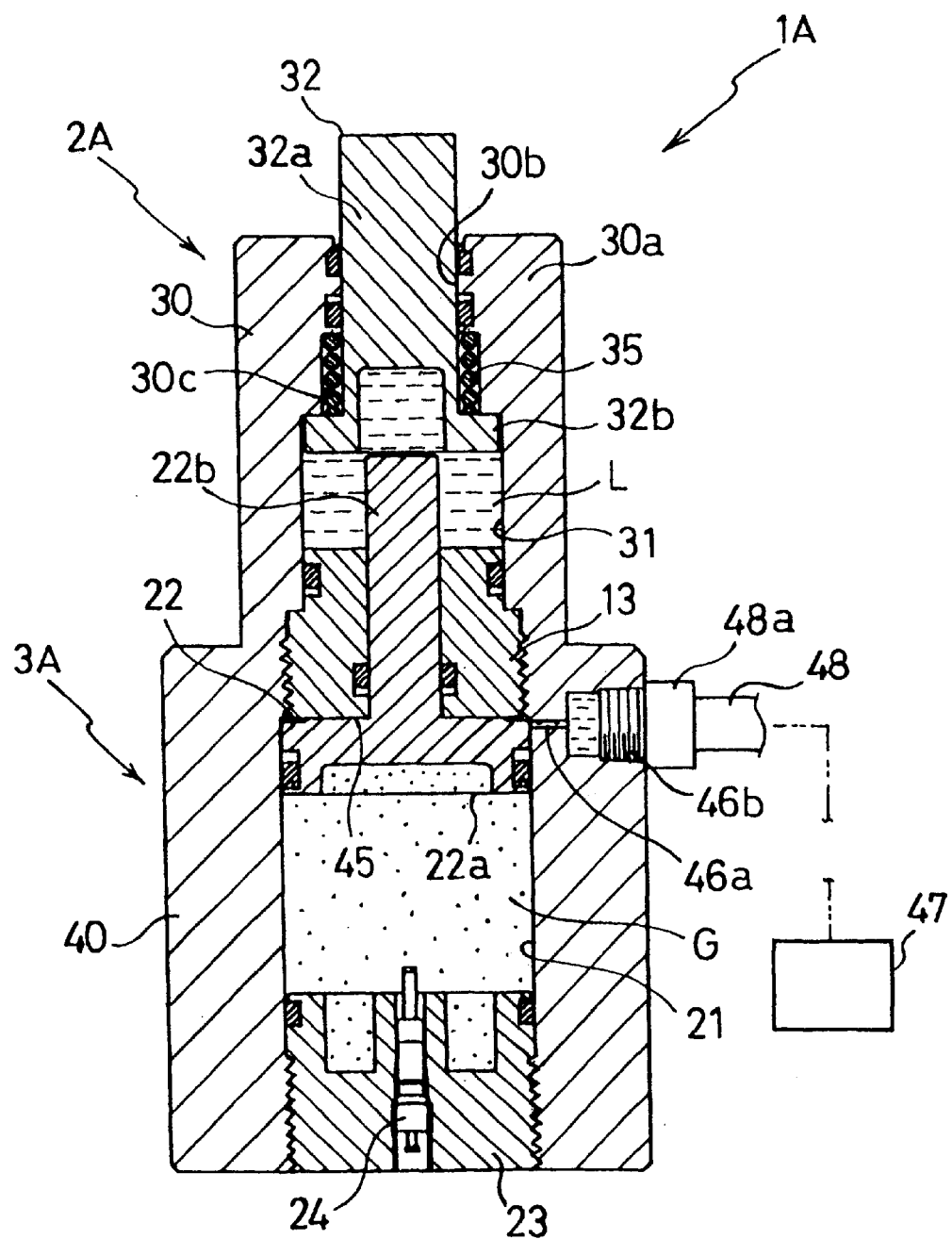
FIG. 3 is a vertical cross-section diagram of the fluid pressure cylinder of a first alternative embodiment of the present invention (in its extended state).
Figure 4:
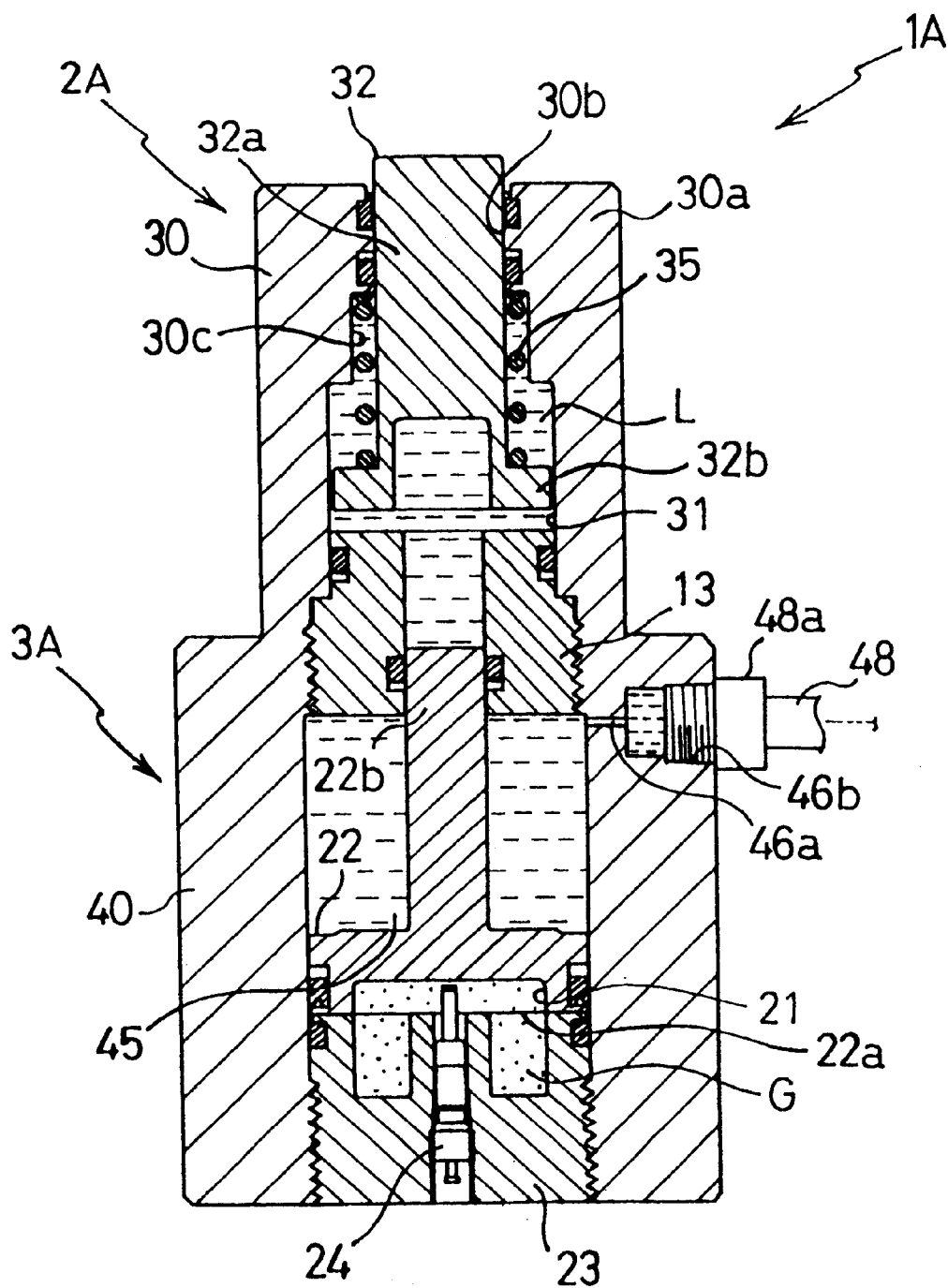
FIG. 4 is a vertical cross-section diagram of the fluid pressure cylinder of FIG. 3 (in its retracted state).

Referring to FIGS. 3 and 4, fluid pressure cylinder 1A of the first alternative embodiment, has gas spring 3A provided with an oil chamber for retraction 45 to cause pressure-receiving means 22 to retract, configured such that pressure-receiving means 22 is made to retract when hydraulic pressure is provided to the oil chamber for retraction 45, and hydraulic cylinder 2A provided with a compressed coil spring 35 (spring part) which pushes output piston 32 toward the retraction side.

Cover wall 30a of cylinder body 30 of hydraulic pressure cylinder 2A is made thicker in the vertical direction than above-mentioned cover wall 10a. Within cover wall 30a, a spring-seating hole 30c is formed from the underside, with a diameter that is larger than passage hole 30b. Compressed coil spring 35, mounted in spring-seating hole 30c and fitting around rod 32a of piston 32, elastically pushes pressure-receiving part 32b to the downward side (retracted position).

Furthermore, when compared to above-mentioned hydraulic pressure cylinder 2, rod 32a of piston 32 is longer by the amount of the increased thickness in cover wall 30a in the vertical direction. In this way, the volume of oil chamber 31 is reduced, but it would also be acceptable to make the length of cylinder body 30 longer and the volume of oil chamber 31 larger.

Oil chamber for retraction 45 is formed inside cylinder part 40 in the space between partitioning means 13 and pressure-receiving part 22a of pressure-receiving means 22. Cylinder part 40 is formed with thicker walls than above-mentioned cylinder part 20. Within cylinder part 40 is formed oil channel 46a which connects to oil chamber for retraction 45 and hydraulic pressure delivery port 46b. Hydraulic pressure hose 48, extending from a hydraulic pressure supply unit 47, is connected to this hydraulic pressure delivery port 46b, via connection plug 48a.

With fluid pressure cylinder 1A, oil chamber for retraction 45 is provided to retract pressure-receiving means 22. By providing hydraulic pressure to this oil chamber for retraction 45, pressure-receiving means 22 is retracted. As a result, even without applying a very strong external force to output piston 32 in opposition to above-mentioned strong pushing force, by providing comparatively low pressure hydraulic pressure to oil chamber for retraction 45, pressure-receiving means 22 can be retracted easily. In addition, in hydraulic pressure cylinder 2A, compressed coil spring 35 is provided to apply a pushing force on piston 32 in the return direction. As a result, by retracting pressure-receiving means 22, piston 32, in a linked motion, is surely made to retract, through the pushing force of compressed coil spring 35.

Second Alternate Embodiment

Figure 5:
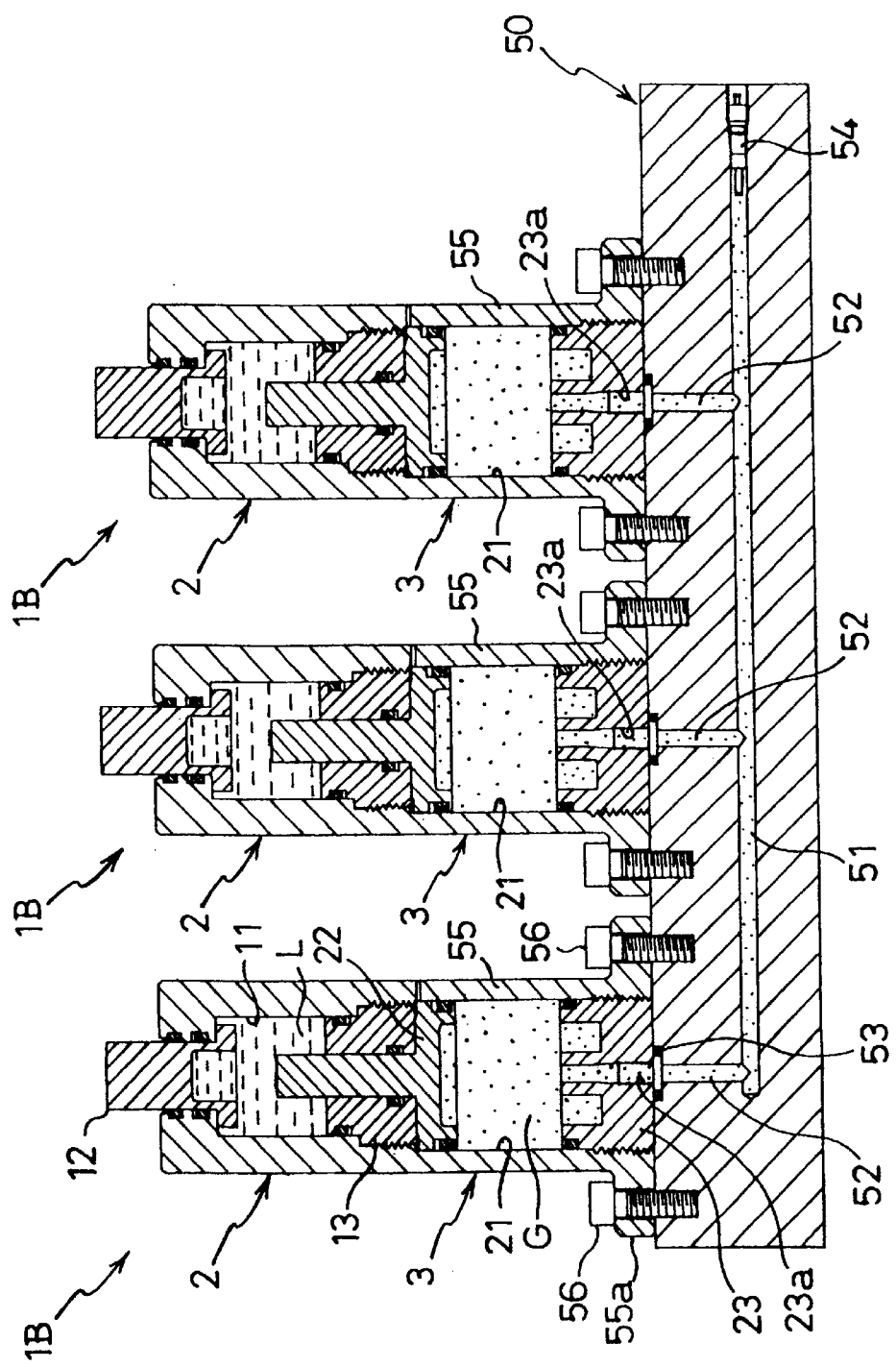
FIG. 5 is a vertical cross-section diagram of multiple fluid pressure cylinders and the base plate of a second alternative embodiment of the present invention.

Referring to FIG. 5, the second alternative embodiment, consists of a plurality of fluid pressure cylinders 1B positioned on a common base plate 50. Each fluid pressure cylinder 1B has essentially the same structure as above-mentioned fluid pressure cylinder 1A, but in the lower portion of cylinder part 55, flange 55a is formed integrally therewith. Flange 55a is secured to the top surface of base plate 50 by means of a plurality of bolts 56, and check valve 24 is eliminated in gas passage hole 23a of cylinder end wall 23.

A common gas passage 51 is formed in base plate 50 in the horizontal direction. In the vertical direction, a plurality of branch gas passages 52 connect to each of gas actuating chambers 21 of fluid pressure cylinders 1B via the gas passage hole 23a thereof. Furthermore, in proximity to the connection of each gas passage hole of each fluid pressure cylinder 1B to branch gas passage 52, gas sealing is provided by one of O-ring 53, between cylinder end wall 23 and base plate 50.

At the gas supply end of common gas passage 51, a check valve 54 is built in, common to the plurality of fluid pressure cylinders 1B connected to this common gas passage 51. Compressed gas fills the gas actuating chambers 21 of fluid pressure cylinders 1B, gas passage holes 23a, branch gas passages 52, and common gas passage 51. In other words, the gas pressure in the plurality of gas actuating chambers 21 of fluid pressure cylinders 1B is made uniform.

In addition, simply by providing the common check valve 54, a plurality of gas actuating chambers 21 are filled with compressed gas in one operation, making it very easy to perform the work of charging the chambers with compressed gas. Furthermore, instead of a fluid pressure cylinder 1B, a fluid pressure cylinder essentially the same as above-mentioned pressure cylinder 1A may be applied.

Third Alternate Embodiment

Figure 6:
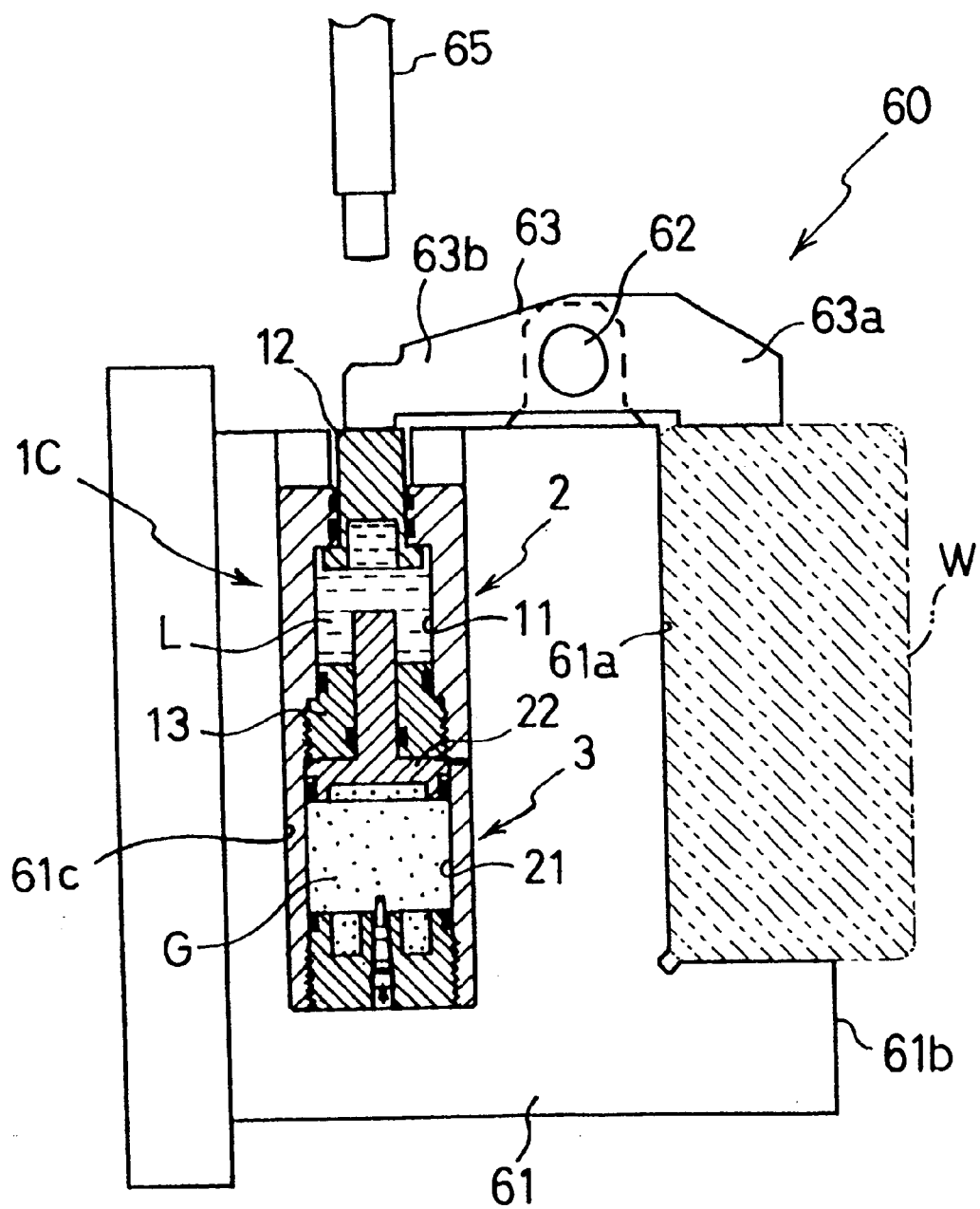
FIG. 6 is a vertical cross-section diagram of a clamping apparatus (in its clamped state) equipped with a fluid pressure cylinder according to a third alternative embodiment of the present invention.
Figure 7:
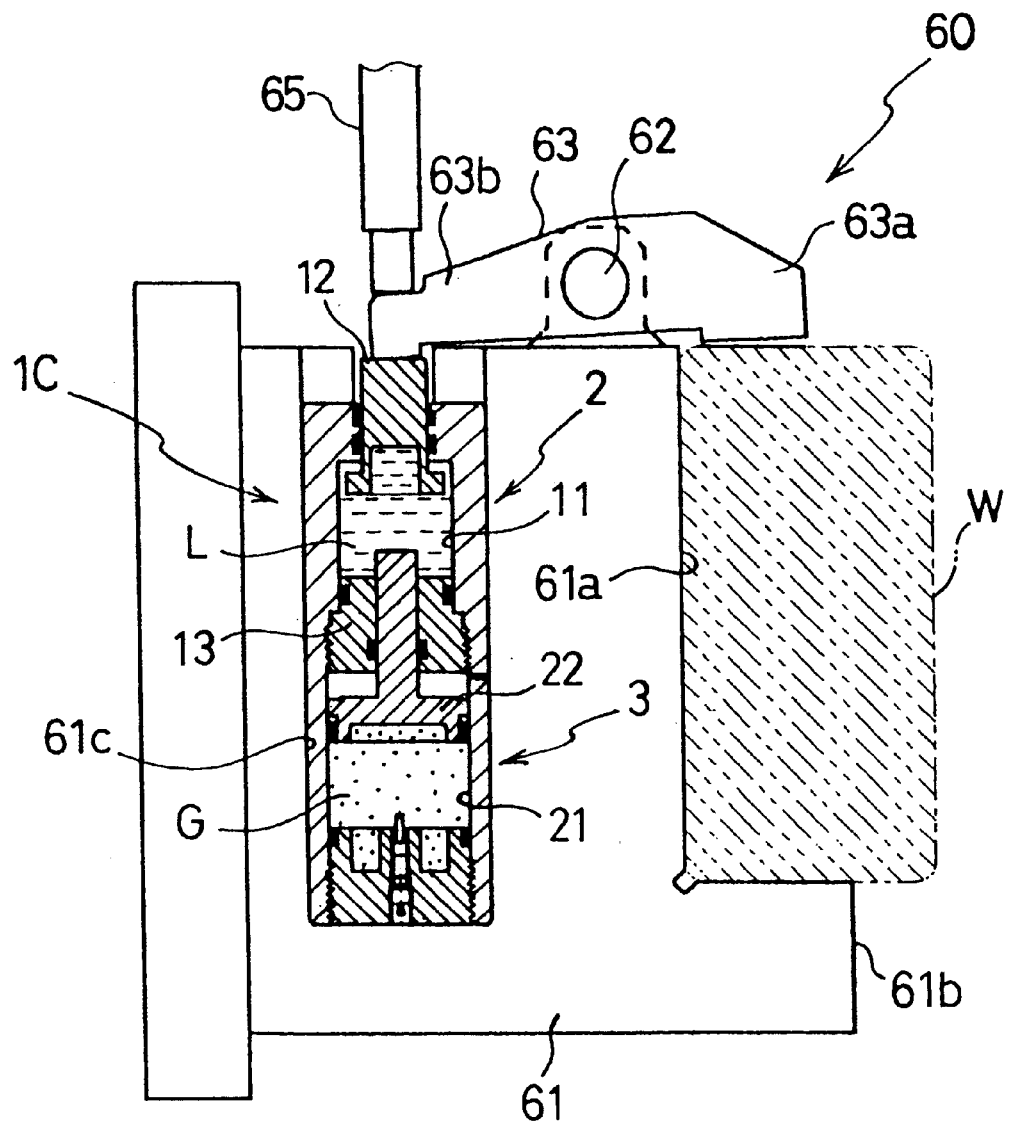
FIG. 7 is a vertical cross-section diagram of the clamping apparatus of FIG. 6 (in its clamp released state).

Referring to FIGS. 6 and 7, the third alternative embodiment applies fluid cylinder 1C which is of the same construction as above-mentioned fluid pressure cylinder 1 as the output mechanism of a clamping apparatus 60. This clamping apparatus 60 comprises a base 61 and a clamp arm 63, rotatably supported by a horizontal pivot shaft 62 on the top side of base 61. Base 61 has a vertical face 61a, which can stop the work to be clamped W, and a support means 61b of base 61, extending from the lower side of vertical face 61a, capable of supporting work to be clamped W.

Clamp arm 63 consists of pushing arm 63a, which extends from pivot shaft 62 beyond vertical face 61a and can push work to be clamped W against support means 61b of base 61, and input arm 63b, which extends from pivot shaft 62 in the opposite direction as pushing arm 63a. Fluid pressure cylinder 1C, fitted into the inside of mounting hole 61c formed in base 61, inputs force to the end of input arm 63b.

FIG. 6 shows clamping apparatus 60 in its clamped state, while FIG. 7 shows clamping apparatus 60 in its clamp release state. In the clamped state of FIG. 6, the strong pushing force of fluid pressure cylinder 1C is conveyed from output rod 12 to clamp arm 63 and by means of this pushing force, clamp arm 63 is pushed to the clamped position and the work to be clamped W is strongly clamped.

From the state where clamp arm 63 is in its clamping position, if an external rod 65 for releasing the clamp is driven downward, output rod 12 is pushed downward by this rod 65, via clamp arm 63, and retracts. Clamp arm 63 rotates to the clamp release position. In this state, quick unloading and reloading of work to be clamped W to the clamp set position is performed. From this state, if rod 65 is driven upward, output rod 12 moves to protrude in an upward direction and clamp arm 63 is driven from the clamp release position to the clamped position.

With this clamping apparatus 1, by applying fluid pressure cylinder 1 of this invention as the force output mechanism, it is possible to increase the clamping force markedly, to clamp strongly the work to be clamped W. In addition, because fluid pressure cylinder 1, with its simple structure, can be compactly built into base 61, and a big advantage is gained by making the overall clamping apparatus smaller.

Furthermore, instead of fluid pressure cylinder 1C, a fluid pressure cylinder essentially the same as above-mentioned fluid pressure cylinder 1B could be applied. In this case, in fluid pressure cylinder 2A, compressed coil spring 35 is provided to force output piston 32 in the retract direction when hydraulic pressure is supplied to oil chamber for retraction 45 and pressure-receiving means 22 is retracted. As a result, external rod 65 for clamp release becomes unnecessary. However, it is desirable to provide some form of a return mechanism, such as a spring, to cause clamp arm 63 to return to its clamp release position.

Forth Alternate Embodiment

Figure 8:
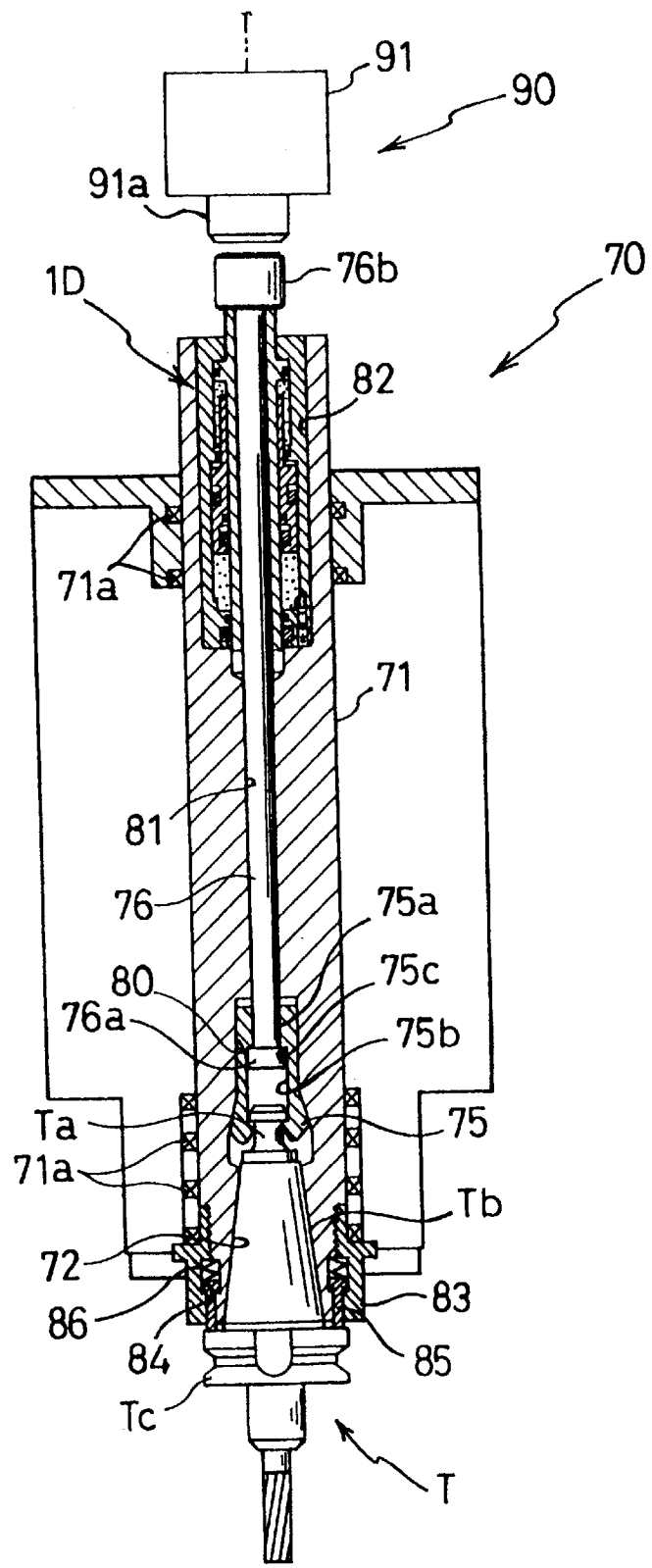
FIG. 8 is a vertical cross-section diagram of a tooling exchanging/securing apparatus (in its "tool secured" state) equipped with a fluid pressure cylinder according to a fourth alternative embodiment of the present invention.
Figure 9:
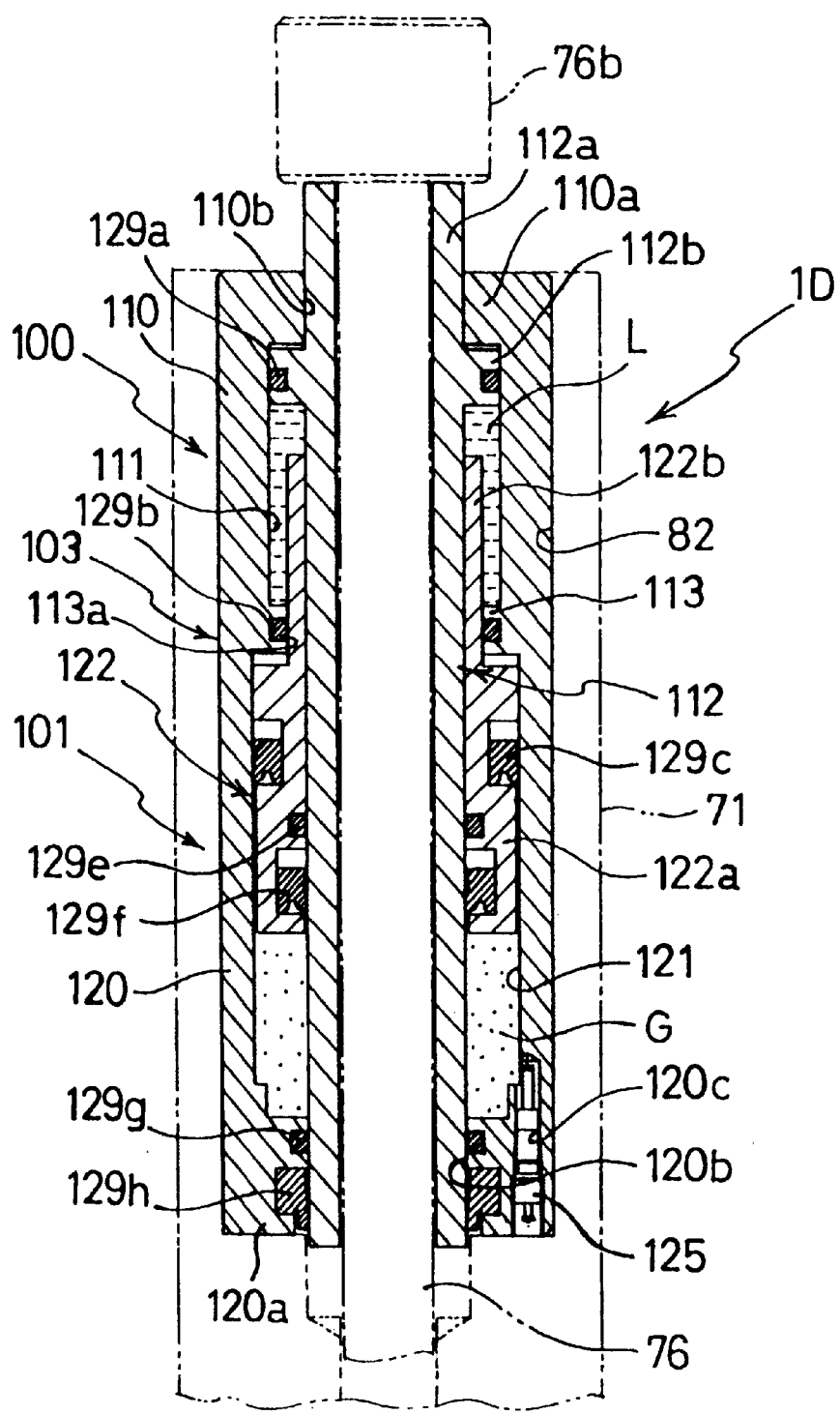
FIG. 9 is a vertical cross-section diagram of the fluid pressure cylinder of FIG. 8 (in its clamped state).
Figure 10:
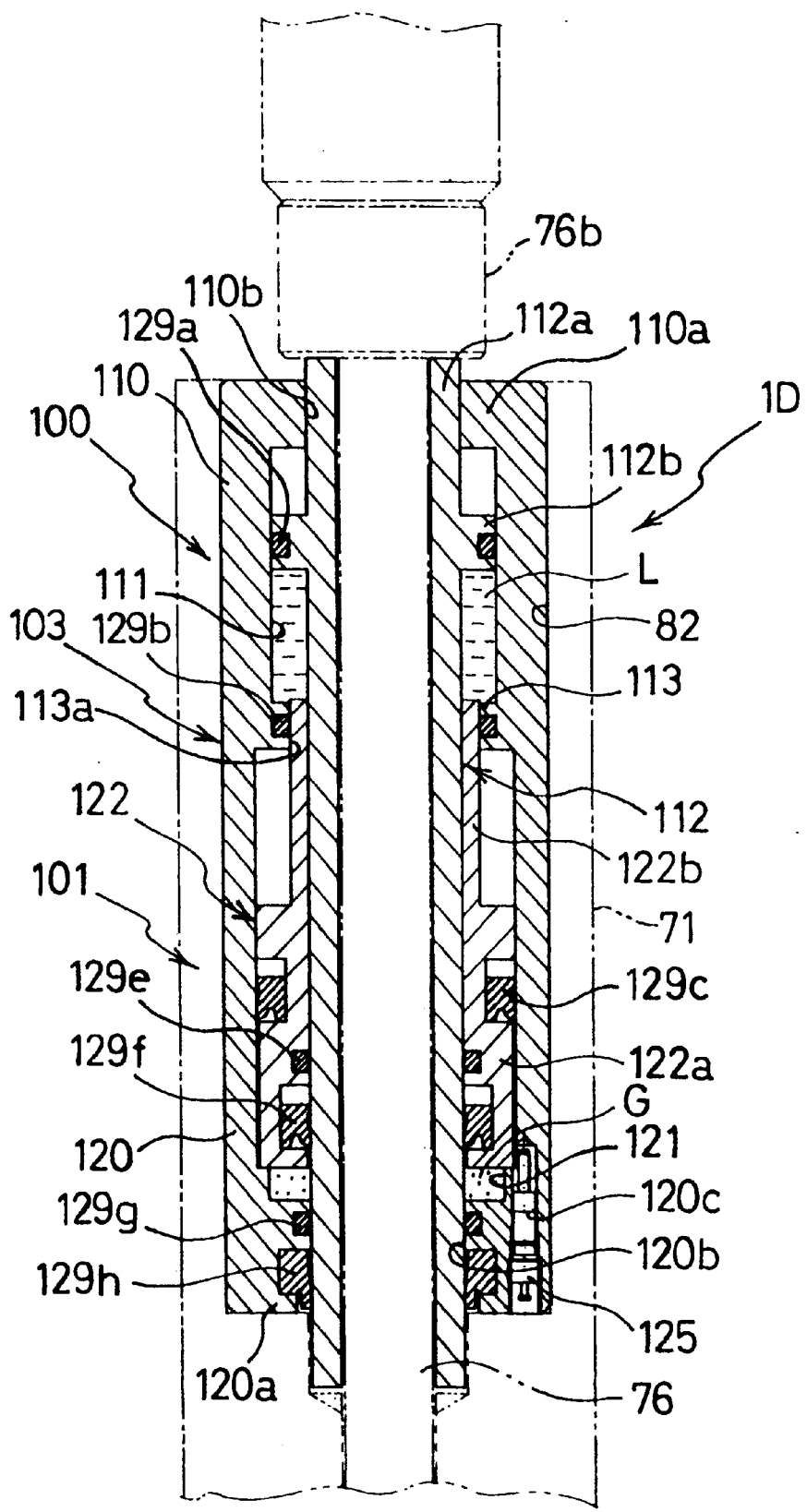
FIG. 10 is a vertical cross-section diagram of the fluid pressure cylinder of FIG. 8 (in its clamp released state).

Referring to FIGS. 8 through FIG. 10, the fourth alternative implementation applies the invention to a tool securing apparatus which secures tools at the end of the main shaft of a machine tool such that they can be released.

As shown in FIG. 8, the main shaft of a machine tool is supported by a plurality of bearings 71a, so that it freely rotates. At the end of the main shaft is formed a tool holding bore 72 with a tapered shape such that the diameter is increasingly larger as its end is approached.

Tool securing apparatus 70 includes a collet 75, which engages mating portion of the base of tool T, such that it can be engaged or disengaged. A draw bar 76 is linked to collet 75. A fluid pressure cylinder 1D, unique to this invention, pushes draw bar 76 to the "tool secured" side (the base end side of main shaft 71). Release mechanism 90 drives draw bar 76 to the "tool release" side (the distal end side of main shaft 71) in opposition to the pushing force of fluid pressure cylinder 1D.

In main shaft 71, tool holding bore 72, housing hole 80 in which collet 75 is housed, passage hole 81 through which draw bar 76 passes, and cylinder attaching hole 82 are formed serially from the distal part to the basal part of main shaft 71. Sleeve 83 is secured to the distal end of main shaft 71, by having its basal part fitted to the outside of main shaft 71 by a threaded fit. Between the distal part of sleeve 83 and main shaft 71, a plurality of holes 84 are formed. Mounted internally in each hole, such that its base portion can slide freely, is a pushing means 85, the distal end thereof protruding in the direction of the distal end of main shaft 71. By means of a plurality of plate springs 86, inserted into holes 84, pushing means 85 are pushed toward their distal ends. Collet 75, having its distal end divided into 3 or 4 sections, is configured as a divided body having elasticity. Collet 75 has a shaft hole 75a, through which draw bar 76 passes, and a large diameter hole 75b with a diameter larger that shaft hole 75a formed at the distal end of shaft hole 75a. Internally fitting in large diameter hole 75b, is stopper 76a, fixed at the distal end of draw bar 76. Here, tool T has an engaging part Ta and a large diameter disc Tc formed at the distal end of tapered shaft part Tb.

When draw bar 76 moves to the side where the tool is secured stopper 76a is stopped by the shoulder part 76c at the border of shaft hole 75a. Large diameter hole 75b and collet 75 also move toward its basal end. Thereupon, the divided body of the distal end of collet 75 closes, while moving deeper into housing hole 80. On the way, collet 75 engages the engaging part Ta of tool T and, after engaging part Ta is pulled in the direction of its basal end and in the state that tapered shaft part Tb of tool T comes to abut tool holding bore 72, the tool becomes secured.

When tapered shaft part Tb of tool T is secured in the disc part Tc of tool T is in state of being spring-loaded towards its distal end, due to pushing means 85 with force applied by flat springs 86. When draw bar 76 moves toward the release side, the stopped state of stopper 76a against shoulder part 75c is released and tool T is pushed toward its distal end by pushing means 85 and is released. Also, the divided body of the distal end of collet 75, which has elasticity, moves in the direction of its distal end and as a result engaging part Ta of tool T is disengaged from collet 75 and tool T is released.

In other words, by applying pushing force on draw bar 76 in the tool securing direction (toward the basal end of main shaft 71) by means of fluid pressure cylinder 1D, draw bar 76 is driven from the tool release position to the tool secure position, draw bar 76 can be held in the "tool secure" position, and tool T can be secured in tool holding bore 72.

Description of Fluid Pressure Cylinder 1D

Referring to FIGS. 9 and 10, fluid pressure cylinder 1D includes a hydraulic pressure cylinder 100 and a gas spring 101. Hydraulic pressure cylinder 100 and gas spring 101 have a common cylinder main body 103 and are arranged in a straight row pattern in the vertical direction. Cylinder main body 103 is fitted inside cylinder attaching hole 82 of main shaft 71 and is secured.

Hydraulic pressure cylinder 100 includes a cylinder body 110, which makes up about the upper half of cylinder main body 103, an oil chamber 111, formed inside cylinder body 110 and filled with oil L, an output piston 112, which receives the hydraulic pressure of oil chamber 111, and a partitioning part 113, which forms the cylinder end wall. A passage hole 110b is formed in head cover 110a of cylinder body 110. A hollow rod part 112a of output piston 112 is slidably inserted in passage hole 110b.

Output piston 112 has above-mentioned hollow rod part 112a and a pressure-receiving part 112b made near the top end of hollow rod part 112a. Hollow rod part 112a is externally fitted so that it slides freely on draw bar 76 and is also built so that it passes through cylinder main body 103. Pressure-receiving part 112b is fitted inside cylinder body 110 so that it can slide freely. Partitioning means 113 extends toward the inside of cylinder body 110 and externally fits to the outer surface of output part 122b of pressure-receiving part 122 of gas spring 101, so that output part 122b can slide freely.

Gas spring 101 includes a cylinder 120, a gas actuating chamber 121, charged with compressed gas G and having an outer diameter slightly larger than the diameter of above-mentioned oil chamber 111, a pressure-receiving means 122 which receives the gas pressure of gas actuating chamber 121, and partitioning means 113 which, while forming a head cover, is common to hydraulic pressure cylinder 100. Gas spring 101 is configured to enable pressurizing oil L in oil chamber 111 of hydraulic pressure cylinder 100 to a pressure higher than above-mentioned gas pressure. Cylinder 120 is formed integrally with cylinder body 110 of hydraulic pressure cylinder 100, making above-mentioned cylinder main body 103. By means of partitioning means 113, oil chamber 111 is partitioned from gas actuating chamber 121.

Pressure-receiving means 122 is formed in a sleeve shape and is externally fitted on hollow rod part 112a at a location lower than that of pressure-receiving part 122b of output piston 112 and in a manner such that it can slide freely. Pressure-receiving means 122 has pressure-receiving part 122a internally fitted in cylinder 120, so that it slides freely, and output part 122b, which extends upward from this pressure-receiving part 122a. Output part 122b passes through passage hole 113a on the inside of partitioning means 113 and reaches oil chamber 111.

In cylinder end wall 120a of cylinder 120, passage hole 120b is formed and hollow rod part 112a of output piston 112 is slidably internally fitted to that passage hold 120b. Near cylinder end wall 120a, gas passage hole 120c is formed, communicating between gas actuation chamber 121 and the exterior. Into gas passage hole 120c, check valve 125 is internally fitted in a gas-tight manner. Furthermore, although not shown in the figures, a venting hole is formed in cylinder 120, communicating to the gap between partitioning means 113 and pressure-receiving part 122a. Seals 129a~129h are also provided.

In fluid pressure cylinder 1D, oil L in oil chamber 111 of hydraulic pressure cylinder 100 can be pressurized, by means of gas spring 101, to a pressure higher than the gas pressure in gas actuating cylinder 121 of gas spring 101. As a result, a strong pushing force, which could not be generated by gas spring 101 alone, is generated by co-working with hydraulic pressure cylinder 100. This strong pushing force is transmitted from piston 112 to engaging shaft 76b at the end of draw bar 76 which engages at the end of piston 112, enabling a strong pushing force to be applied to draw bar 76 in the "tool securing" direction. This enables tool T to be secured with a strong force. In addition, it basically performs the same functions and produces the same results as above-mentioned embodiments.

Furthermore, releasing mechanism 90, as shown in FIG. 8, is provided in a fixed manner at the base side of main shaft 71. Releasing mechanism 90 has a hydraulic pressure cylinder 91 which is controlled by a drive control means which includes a supply source for hydraulic pressure. The drive control means is configured to push engaging shaft 76b of draw bar 76 with the end of piston rod 91a, thus pushing piston 112 (pressure-receiving means 122) back into its retracted position at the basal end and also, driving draw bar 76 in the "release" direction.

Fifth Alternate Embodiment

Figure 11:
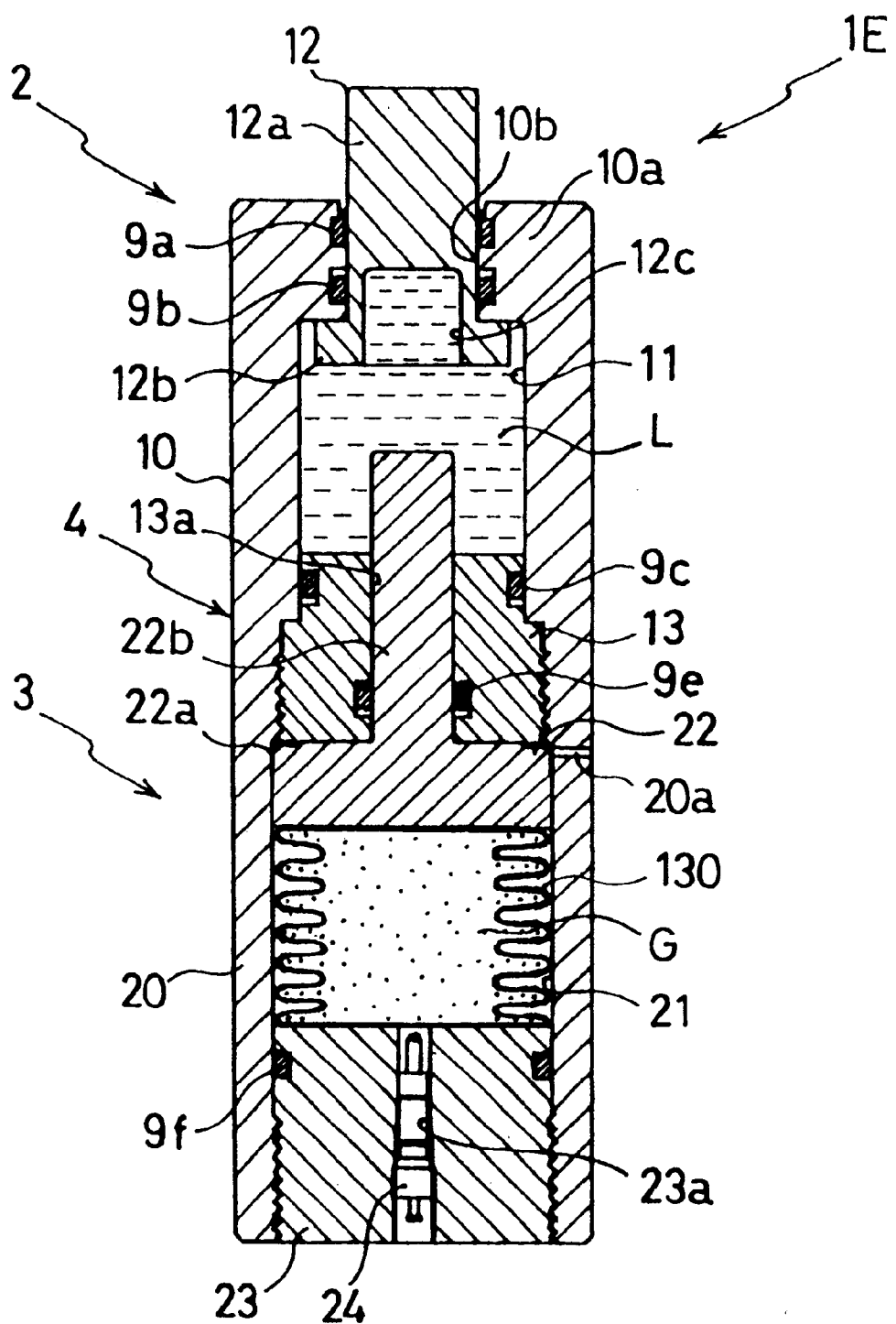
FIG. 11 is a vertical cross-section diagram of the fluid pressure cylinder according to a fifth alternative embodiment of the present invention.

Referring to FIG. 11, the fluid pressure cylinder of the fifth embodiment is a fluid cylinder of the same basic structure as above-mentioned fluid pressure cylinder 1 wherein a bellows 130, for example of stainless steel, is mounted in gas actuation chamber 21. Bellows 130 is charged with compressed gas, and pressure-receiving means 22 receives the pressure of this gas pressure via bellows 130. Gas passage hole 23a, in which a check valve is built in, communicates with the interior of bellows 130 in a gas-tight manner. To achieve that, the base surface of bellows 130 and the top surface of cylinder end wall 23 may be bonded or a suitable sealing means may be mounted in proximity to the connection point between bellows 130 and gas passage hole 23a.

In this way, because bellows 130 is mounted to gas actuating chamber 21 and bellows 130 is filled with compressed gas, there is almost no gas leakage of the compressed gas during long periods of use. This results in a stable pushing force being achieved during long periods. Because bellows 130 can be charged with gas after bellows 130 is mounted inside gas actuating chamber 21, assembling bellows 130 is also easy. Furthermore, above-mentioned fluid pressure cylinders 1A–1D could also be configured to have a bellow of a suitable structure mounted in their gas actuating chambers and those bellows charged with compressed gas. However, the bellows mounted in gas actuating chamber 121 of fluid pressure cylinder ID is configured in a circular shape.

Finally, variations of above-mentioned embodiment and alternative embodiments will be described.

Cylinder and cylinder main body may be formed as separate units. Also, the cylinder and cylinder main body may be connected by threading, etc. to form one body. Also, it is not absolutely necessary to arrange the gas spring an hydraulic pressure cylinder in a straight row pattern. In the fluid pressure cylinder of FIGS. 1–7, the pressure-receiving part of the output piston may be internally fitted in the cylinder main body so that it can slide freely. In this case, a venting hole is formed, communicating to the space between the pressure-receiving part and the cover wall. Also, a gas accommodating hole capable of accommodating compressed gas may be formed in the output rod of the pressure-receiving means.

In addition, embodiments with a variety of variations added to the above-mentioned embodiment and alternative embodiments could be implemented in a range that does not deviate from the substance of this invention. Also, besides use as a shock-absorbing mechanism, etc. for press machines or as an outputting mechanism for clamping apparatuses, etc. this invention can be applied to various apparatuses and mechanisms that require a pushing function.

According to the present invention, a gas spring is provided, comprising a gas actuating chamber filled with compressed gas and a pressure-receiving means which receives the gas pressure of a gas actuating chamber, and by means of this gas spring, the liquid in a liquid chamber of a liquid pressure cylinder can be pressurized to a pressure higher than above-mentioned gas pressure. As a result, a strong pushing force can be generated and heavy loads supported. The gas actuating chamber is charged with compressed gas from an existing compressed gas supply source, such as a gas tank, and by means of the pushing force of the gas spring, the liquid pressure of the liquid chamber is intensified by a factor of several times, enabling generation of above-mentioned strong pushing force. As a result, the structure of liquid pressure cylinders having a spring function can be reduced in size and advantages are also obtained in regard to preventing leaks of compressed gas and in enabling reduced production cost.

According to a feature of the present invention, the cylinder part of the gas spring is formed integrally with above-mentioned cylinder body and gas spring and liquid pressure cylinder are arranged in a straight row pattern. As a result pressure it is possible to make a fluid pressure cylinder with pressure-intensifying function having a simple structure and to achieve reduced production cost.

According to another feature of the present invention, interior to the cylinder body a partitioning means is provided which separates the liquid chamber and gas actuating chamber. Because this partitioning means is secured in the cylinder body by a threaded fit, it is simple to form a liquid chamber and gas actuating chamber inside cylinder part and cylinder body which are formed integrally.

According to a further feature of the present invention, because a passage hole is formed in the separating means, through which the output rod of the pressure-receiving means passes in a freely sliding manner, the end of the output rod can be made to contact the liquid in the liquid chamber and to surely pressurize the liquid.

According to another feature of the present invention, a liquid chamber for retraction is made in order to retract the pressure-receiving means. Because the pressure-receiving means is retracted by supplying liquid pressure to this liquid chamber for retraction, it is possible to retract the pressure-receiving means easily by supplying liquid pressure of a relatively low pressure to the liquid chamber for retraction, without applying a very strong external force to the output piston. In a linked motion, it is possible to retract the output piston.

According to still a further feature of the present invention, because a spring which pushes the piston in the retract direction is provided, it is possible to reliably retract the output piston by means of the pushing force of the spring along with retraction of the pressure-receiving means.

According to another feature of the present invention, because above-mentioned liquid chamber for retraction is formed between the pressure-receiving part of the pressure receiving means and the partitioning means, it is possible to make the pressure-receiving part of the pressure receiving means receive the liquid pressure of the liquid chamber for retraction and, by supplying hydraulic pressure of a comparatively low pressure to the liquid chamber for retraction, to retract the pressure-receiving means.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A fluid pressure cylinder with pressure intensifying function comprising:
   a cylinder body;
   a liquid chamber within said cylinder body, said liquid chamber filled with liquid;
   an output piston which receives liquid pressure from said liquid chamber;
   a gas spring having a gas actuating chamber, filled with compressed gas, and a pressure-receiving means, which receives gas pressure of said gas actuating chamber;
   said gas spring pressurizes said liquid in said liquid chamber to a pressure higher than said gas pressure;
   a check valve inserted into said cylinder body and connecting said gas actuating chamber to an exterior of said cylinder body;
   a partitioning means internal to said cylinder body, separating said liquid chamber and said gas actuating chamber;

said partitioning means being secured to the cylinder body by a threaded fit;

a passage hole in said partitioning means; and an output rod part of the pressure-receiving means is inserted in said passage hole such that it slides freely.

2. The fluid pressure cylinder with pressure intensifying function according to claim 1, further comprising;

a cylinder part of said gas spring is integral with said cylinder body; and said gas spring and said liquid chamber are arranged in a substantially straight row.

3. The fluid pressure cylinder with pressure intensifying function according to claim 1, wherein said partitioning means is secured along a substantial portion of its axial length to the cylinder body.

4. A fluid pressure cylinder with pressure intensifying function, comprising:

a cylinder body;

a liquid chamber within said cylinder body, said liquid chamber filled with liquid;

an output piston which receives liquid pressure from said liquid chamber;

a gas spring having a gas actuating chamber, filled with compressed gas, and a pressure-receiving means, which receives gas pressure of said gas actuating chamber, said gas spring pressurizes said liquid in said liquid chamber to a pressure higher than said gas pressure;

a partitioning means internal to said cylinder body, separating said liquid chamber and said gas actuating chamber;

a passage hole in said partitioning means; and an output rod part of the pressure-receiving means;

said output rod part being inserted in said passage hole such that it slides freely.

5. The fluid pressure cylinder with pressure intensifying function according to claim 4, further comprising:

a liquid chamber for retraction in said gas spring for retracting said pressure-receiving means; and said pressure-receiving means is retracted by supplying liquid pressure to said liquid chamber for retraction.

6. The fluid pressure cylinder with pressure intensifying function according to claim 5, further comprising a spring for applying a pushing force on said output piston in a retract direction.

7. The fluid pressure cylinder with pressure intensifying function according to claim 5, wherein said liquid chamber for retraction is formed between said partitioning means and said pressure-receiving part of said pressure-receiving means.

8. The fluid pressure cylinder with pressure intensifying function according to claim 6, wherein said liquid chamber for retraction is formed between said partitioning means and said pressure-receiving part of said pressure-receiving means.

9. The fluid pressure cylinder with pressure intensifying function according to claim 4, further comprising:

a check valve communicating between an exterior and interior of said gas actuating chamber.

* * * * *